A. T. COVELL.

Gang-Plow.

No. 67,501.   Patented Aug 6. 1867.

Witnesses:
Cyrus Smith
Geo H Strong

Inventor:
A T Covell
By his Attys
D Avey & Co

United States Patent Office.

ALLEN THOMPSON COVELL, OF SAN LEANDRO, CALIFORNIA.

*Letters Patent No. 67,501, dated August 6, 1867.*

---

GANG-PLOUGH.

---

The Schedule referred to in these Letters Patent and making part of the same.

---

TO ALL WHOM IT MAY CONCERN:

Be it known that I, ALLEN THOMPSON COVELL, of San Leandro, county of Alameda, State of California, have invented certain new and useful Improvements in "Gang-Ploughs;" and I do hereby declare the following description and accompanying drawings are sufficient to enable any person skilled in the art or science to which it most nearly appertains to make and use my said invention or improvements without further invention or experiment.

The nature of my invention is to provide a gang-plough so constructed as to follow the inequalities of the ground and regulate itself with devices for turning to and from land, raising and lowering. In order to accomplish this object I employ a frame mounted on wheels, to which are attached the ploughs. The frame is connected to the pole or neap between two arms or reaches. The ends of the beams are connected by links to arms rigidly attached to a roller; the roller having an upright lever within easy reach of the driver, engages in a toothed rack; a bar dropping down against the lever moves it away from the teeth, allowing the ploughs to conform to the inequalities of the ground. The axle is placed at an angle across the frame to run to and from land, it being raised and lowered on the axle-bed, and is held by clips.

To more fully illustrate and explain my invention, reference is had to the accompanying drawings, of which—

Figure 1:
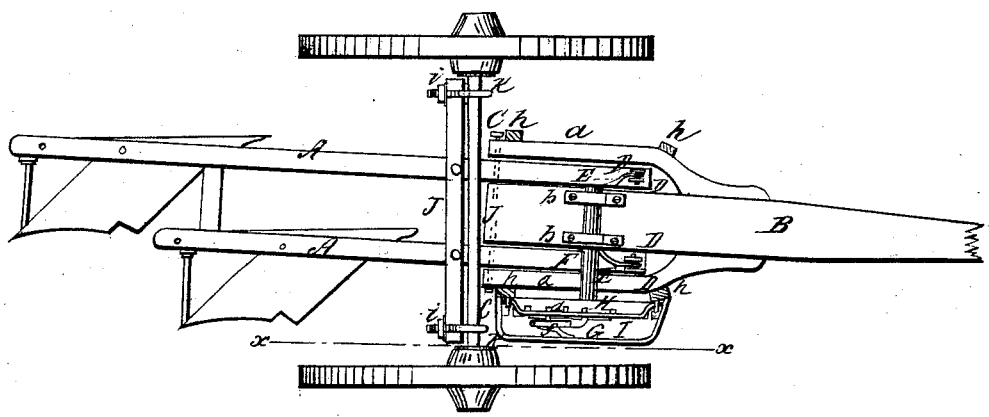
Figure 2:
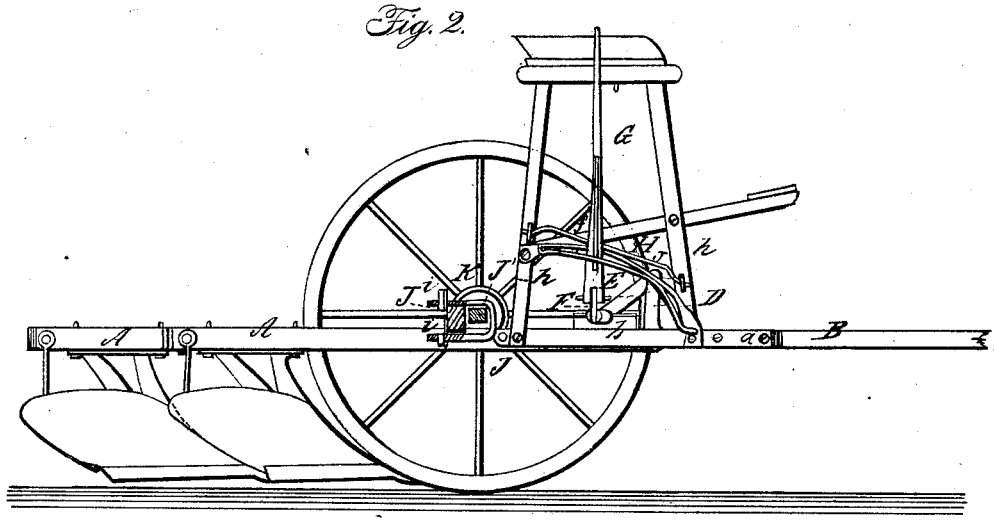
Figure 3:
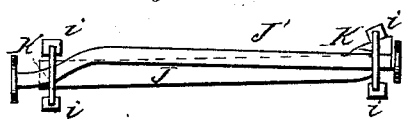

Figure 1 represents a plan.
Figure 2, side sectional elevation.
Figure 3, view of axle and clips.
Similar letters indicate like parts in each of the figures.

A A is the frame or beams to which the ploughs are attached, mounted on wheels and connected to the pole B between the arms or reaches $a\ a$ by the rod C, which forms a hinge for the beams to turn on. Upon the forward ends of the beams are attached upright links, D D, in which arms E E, rigidly attached to a roller, operate. The roller F operates in boxes $b\ b$ bolted to the pole B, and has an upright lever, G, within easy reach of the driver, which, by turning the bar forward, forces the front ends downward, turning upon the hinge-bolt, and balancing or resting on the axle, raises the ploughs attached to the hindmost portion of the beam entirely from the ground with perfect ease. This lever has a lug or projection, $d$, upon one side, which operates between the teeth of a curved rack, H, and a spring, $f$, resting against a curved rod, for keeping the lever in place in the rack. The object of this lever is to raise and lower the beams or frame A A. A curved rod, I, attached to the legs $h\ h$ of the driver's seat by bolts or staples, is pressed down against the projection upon the lever, and prevents it from entering the teeth on the rack, allowing the ploughs to conform to the unevenness of the ground. The axle-bed J is placed across the frame at an oblique angle to it and the pole. To this axle-bed is attached the axle J' by clips K K with set-nuts $i\ i$. Adjustable wedges or temper-blocks of different thicknesses are placed between the axle-bed and axle, to turn the ploughs to or from land by changing the inclination of the wheels, so that their plane of motion is different from that in which the ploughs move. The axle-bed should be let down five-eighths of an inch deeper on the right-hand beam than on that of the left-hand beam, and when it fastens to the beams may be bolted stationary, or with a slot made in the beams, so that the axle-bed may be set forward or backward at either end, to set the wheels to or from land. In order to strike out new lands, or plough where there is no furrow to follow, loosen the clip at the right hand and raise the axle to the top of the same and fasten. To plough shallow, lower the left-hand end of the axle; to plough deep, raise the left-hand end of the axle; for raising the ploughs partially or entirely from the ground, the lever G and toothed rack are employed.

Having thus described my invention, what I claim, and desire to secure by Letters Patent, is—

1. Attaching the beams A A to the pole B, between the reachers $a\ a$, by the rod C, so that the ploughs may be made to move up and down, swinging on the axle J' and rod by operating the lever G when disengaged, substantially as described.

2. Attaching the axle J' and axle-bed J angularly to the frame, the clips K K, and adjusting-blocks $l\ l$, substantially as described and for the purposes set forth.

3. The links D D, attached to the beams or frame, and the rigid arms E E of the roller operating in them, in combination with the beams A A and pole B, substantially as described.

4. The construction, arrangement, and combination of the beams A A, pole B, reaches $a\ a$, rod C, axle and axle-bed J and J', temper-blocks $l\ l$, roller F, and arms E E, together with links D D, substantially as described and for the purposes set forth.

In witness whereof I have hereunto set my hand and seal.

ALLEN THOMPSON COVELL. [L. S.]

Witnesses:
C. W. M. SMITH,
GEO. H. STRONG.